Aug. 17, 1948.  R. BURT  2,447,311
EXPANSIBLE CHAMBER FLUID MOTOR WITH PISTON
ACTUATED VALVE AND PRESSURE ABSORBING
FLEXIBLE ENVELOPE IN CYLINDER
Filed May 15, 1943  2 Sheets-Sheet 2
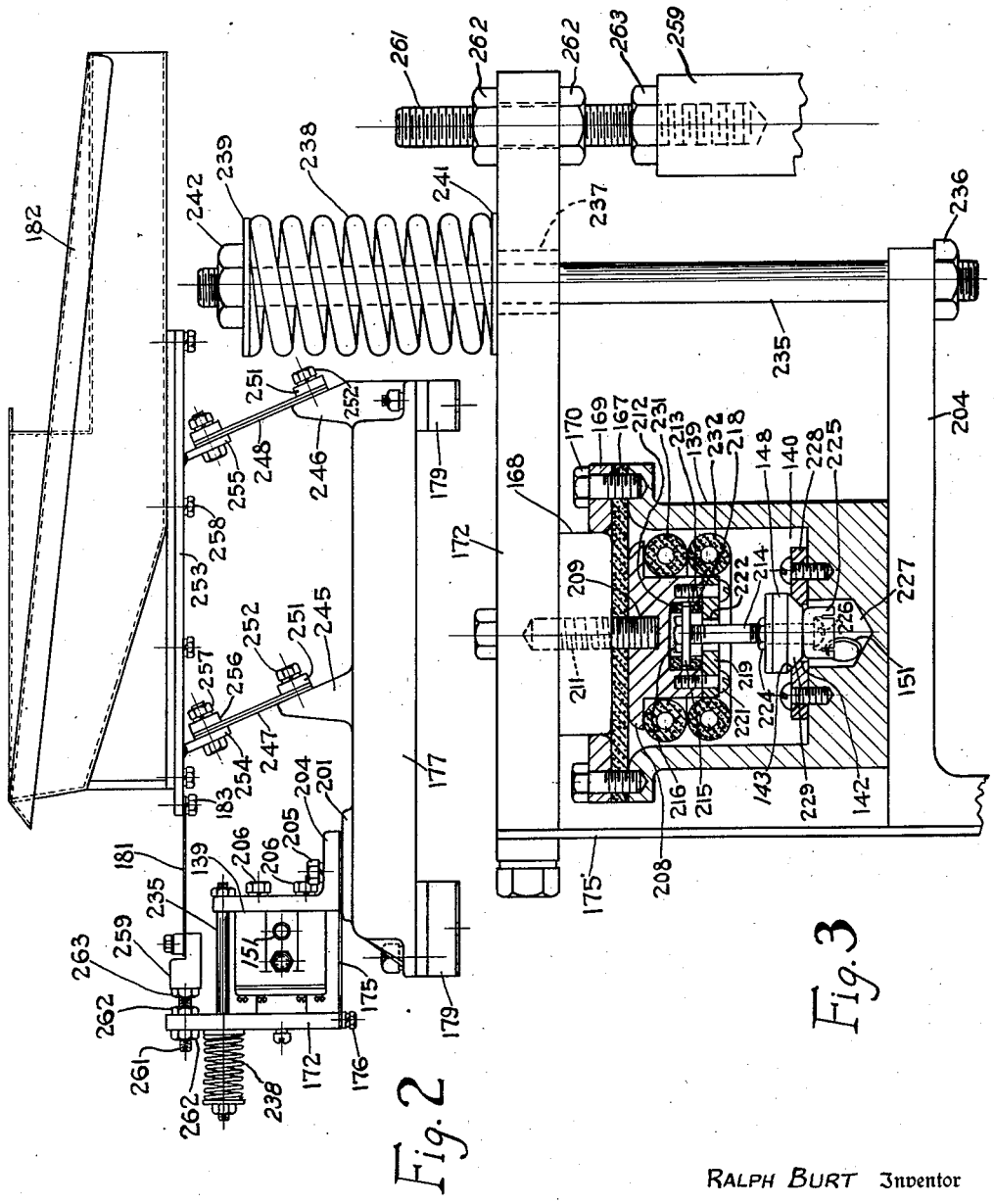
RALPH BURT Inventor
By Lewis D. Konigsford
Attorney Patented Aug. 17, 1948

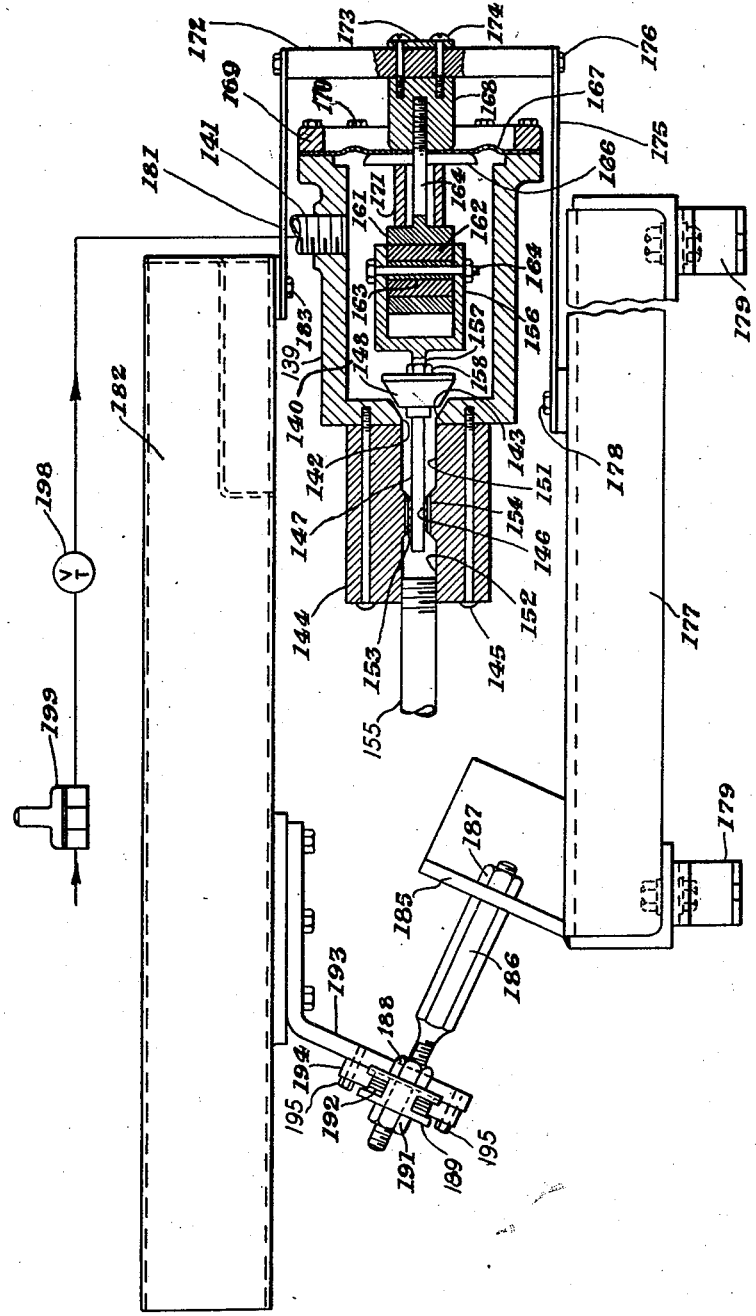

2,447,311

UNITED STATES PATENT OFFICE 2,447,311

EXPANSIBLE CHAMBER FLUID MOTOR WITH PISTON ACTUATED VALVE AND PRESSURE ABSORBING FLEXIBLE ENVELOPE IN CYLINDER

Ralph Burt, Homer City, Pa., assignor to Syntron Company, Homer City, Pa., a corporation of Delaware Application May 15, 1943, Serial No. 487,159

3 Claims. (Cl. 121—164)

The present invention relates to fluid operated vibratory trough conveyors and is a continuation in part of the application filed May 23, 1941, which issued as Patent No. 2,378,979 on June 26, 1945.

It heretofore has been proposed to operate vibratory conveyors by unbalanced rotating weights, or electromagnetic vibratory motors. However, such devices have the disadvantage that the period or frequency of vibration is fixed and when the point of synchronism of the electromechanical forces is reached the apparatus becomes exceedingly sensitive and erratic in operation. Such devices also can not readily be vibrated at a frequency differing from that of the source of electric current. Furthermore there are installations where the use of electricity is not permitted because of fire or explosion hazards, and accordingly only the mechanically operated devices with the attendant wear of bearings, and disadvantages of long power transmission shafts, belts, etcetera can be employed. Such mechanical devices have not, in general, proved very satisfactory as they require considerable maintenance expense and frequent repair.

Accordingly, it is an object of the present invention to provide a fluid operated vibratory conveyor apparatus that may be directly operated by fluid under pressure.

Another object is the provision of a fluid operated vibratory conveyor apparatus having an adjustable stroke and an adjustable period of vibration.

A further object is the provision of a fluid operated vibratory conveyor apparatus capable of relatively high frequency of vibration and which is compact, of relatively simple construction, and can be employed for heavy duty.

Still another object is the provision of a fluid operated vibratory motor of simple construction capable of vibrating at a high frequency and which is positive in operation, and is rugged enough to be employed for a large variety of applications.

In accordance with the present invention, I provide a vibratory conveying apparatus having a chamber in which a pressure responsive element is located, such as, for example, a bellows, or flexible diaphragm, and is connected to a control valve through a yieldable or resilient linkage whereby the control valve may move with a snap action to control the period of vibration and the amplitude of the stroke of the pressure responsive element.

In order to obtain a sufficiently high period of vibration in a compact structure, I prefer to employ natural or synthetic rubber materials to provide the yieldable or resilient linkage between the pressure responsive element and the control valve. Such materials have the requisite stiffness and resiliency so that a linkage of this type is very compact. The vibration of the pressure responsive element or the vibratory reaction of the chamber member itself may be employed for useful work by connecting a conveyor trough thereto, a relatively massive base being connected to the other member. For example, when the pressure responsive element is connected to a conveyor trough supported by inclined resilient supports and the chamber is connected to a base mounted on resilient supports, a vibratory conveyor is produced which has many advantages over the electrically operated or mechanically operated vibratory conveyors heretofore employed, in that, among other things, the amplitude of vibration and the frequency of vibration may be quickly adjusted to obtain the best conveying action on the particular materials being handled. Furthermore, there is no danger of fire or explosion and such apparatus may be used safely in explosive manufacturing or in oil refineries, in aluminum manufacture, or in a powdered coal atmosphere.

The invention will be described in greater detail in the following specification taken in connection with the accompanying drawing, wherein I have shown preferred embodiments of the invention by way of example, and wherein:

Figure 1 is a side view of a preferred embodiment of the invention, the motor being shown in section;

Figure 2 is a side view of a modification, and

Figure 3 is a sectional view of the motor illustrated in Figure 2.

Referring to Figure 1 of the drawing, the motor comprises a cylindrical housing 139 providing a valve chamber 140 and having an inlet 141 and an outlet bore 142, the latter being surrounded by a valve seat surface 143. A cylindrical guide member 144 is secured to the housing 139 by screws 145 and has a central bore 146 which receives the guide stem 147 attached to a tapered valve member 148. The guide member is counterbored at its ends, as indicated at 151 and 152 to provide a web 153 therebetween and a plurality of bores 154 pass through the web 153 to connect bores 151 and 152 and thus allow flow of fluid from chamber 140 to the outlet pipe 155 when the valve is open.

A clevis 156 has its end 157 threaded into the valve 148 and locked in position by a lock nut 158. A sleeve 161 contains a grommet or bushing 162 of rubber or other solid inherently resilient material which, in turn, has a metal sleeve 163 therein, and a pivot bolt 164 passes through the clevis 156 and sleeve 163 to secure sleeve 161 to the clevis and allow relative pivotal movement between clevis 156 and sleeve 161. A rod 164 is suitably secured at one end to sleeve 161, as by welding, and passes through a plate 166 and diaphragm 167, and is screw threaded into block 168, a spacer tube 171 being interposed between sleeve 161 and plate 166 so that diaphragm 167 is clamped between plate 166 and block 168. The diaphragm is clamped at its periphery to housing 139 by a ring 169 and bolts 170 and there is thus provided the working or expansible chamber 140 on one side thereof.

A bar 172 is clamped to block 168 by a plate 173 and screws 174 and at its lower end carries a flexible strap 175 suitably secured thereto at one end by cap screws 176 and bolted to the base 177 at its other end by cap screws 178. The base 177 which preferably is massive, rests on vibratory members 179 of suitable construction which are selected or tuned as hereinafter described. One end of a stiff flexible spring strap 181 is secured to the upper end of bar 172, the other end of the strap being fastened to the bottom of a conveyor trough 182, by the cap screws 183. The housing 139 is secured to the base 177 in any suitable manner (not shown).

The front end of the conveyor trough or table 182 is supported for vibration, preferably by inclined bar or leaf springs in such manner as to provide vertical and horizontal components of movement of the trough. As shown, the base 177 has two inclined flanges 185 to which are clamped two threaded hexagonal bars 186 by nuts 187. The opposite ends of bars 186 are reduced and threaded to receive spacer nuts 188 upon which rest spring clips 189 clamped between spacer nuts 188 and lock nuts 191. Horizontal bar or leaf springs 192 which rest in the spring clips are bifurcated at their ends to straddle the middle of the clip. An extension plate 193 is bolted or otherwise suitably secured to the trough 182 and is clamped to the springs 192 at their middle by a clamp bar 194 and bolts 195. Thus, the springs 192 support and guide the front end of the trough 182. The inlet line 142 may have a throttle valve 198 and a water pressure regulator 199 therein.

The operation of the apparatus now will be described. Springs 192 exert a force on diaphragm 167 and on valve 148 tending to hold the valve closed on its seat, this force being transmitted through the conveyor trough 182, strap 181, bar 172 and block 168 to the diaphragm, and through connectors 164, 171, sleeve 161, grommet 162 and clevis 156 to the valve 148. The area of diaphragm 167 is greater than the area of valve opening 142, and a ratio between the limits of about 10 to 1 and 13 to 1 has been found to be satisfactory, although this ratio may be varied somewhat on different fluid pressures, and other suitable ratios may be employed. The fluid, which may be a gas or liquid and which preferably is water under pressure, passes through pressure regulator 199 and throttling valve 198 and is admitted through inlet pipe 141 into chamber 140 and also exerts a force on the valve 148 tending to maintain it closed and exerts a force on the left side of diaphragm 167 which tends to move the diaphragm to the right. As this force increases it exerts a compression stress on resilient bushing or grommet 162, and grommet 162 yields and allows a limited movement of the diaphragm. Continued movement of diaphragm 167 under the force of fluid pressure and continued compression of bushing 162 finally overcomes the force of springs 192 and of the fluid against the valve 148 and moves the valve off its seat, thus opening outlet 142 to relieve the pressure in chamber 140. The opening of valve 148 also relieves the stress on bushing 162. The movement of the diaphragm is reversed as soon as the pressure in chamber 140 drops, due to the stored energy or bias of springs 192 transmitted to the diaphragm 167 which move the diaphragm to the left, the resilient bushing 162 serving to allow the diaphragm to yieldingly follow the valve movement and also to eliminate fluttering or chattering of the valve and thus insures proper seating thereof. The bushing 162 thus allows the trough to complete its amplitude of vibration under the force of springs 192. The closing of valve 148 allows the pressure in chamber 140 to build up and again move the diaphragm to the right, to repeat the cycle of operation. The vibration of diaphragm 167 is transmitted through block 168, bar 172, and strap 181 to the conveyor trough 182, the bar 172 being pivoted at its bottom by strap 175. The springs 192 cause the conveyor to have a vibratory movement with vertical and horizontal components and the straps 175 and 181 allow such movement without interfering with the operation of the diaphragm.

The frequency of vibration and length of stroke of diaphragm 167 depends on several factors including the natural periodicity of leaf springs 192 and the mass of the conveyor trough, the natural periodicity of resilient bushing 162, the pressure of the fluid supplied to chamber 140, the rate of flow allowed by the throttle valve 198, and the relative areas of the diaphragm 167 and the valve opening 142. The apparatus will automatically adapt itself to the natural period of the system so that the heavier the load on the conveyor the less will be the periodicity of the vibration and the greater the amplitude or stroke, and the lighter the load the higher will be the periodicity of the system and the shorter the stroke.

In the modification shown in Figures 2 and 3, wherein like parts are designated by like reference numerals, the base 177 has a boss 201 with its upper face machined flat and a flexible strap 175, preferably of spring steel, is clamped at one end between the angle bracket 204 and the boss 201 by cap screws 205 or the like threaded into the boss. The valve casing 139 is secured to angle plate 205 by screws 206 or the like, and the diaphragm 167 is clamped to the casing 139 by the ring 169 and the bolts 170. The flanged backing member 208 has a bore 209 therein which receives a stud 211 threaded therein and passing through diaphragm 167 into backing plate 208 whereby the diaphragm is clamped between the backing plate 208 and block 168. Backing plate 208 has a bore 213 in which is located a washer 212 of natural or synthetic rubber material. A valve stem 214 has a plate 215 held against a shoulder thereon adjacent one end by the nut 216, this plate being received in the bore 213. A second washer 218 of solid resilient material is located on the opposite side of plate 215, and a metal plate 219 is secured to the backing plate 208 by screws 221 or the like so that the plate 215 and valve stem 214 are resiliently and firmly held between the washers 212 and 218.

A clearance space is provided around the inside of washers 212 and 218 to allow deformation thereof to take place during operation of the apparatus, and a suitable clearance for plate 215 is allowed to prevent binding thereof in bore 213, and the central bore 222 in plate 219 is large enough to allow lateral movement of stem 214 without binding.

The valve stem 214 extends through a suitable hole 222 in plate 219 and at its opposite end carries a valve member 148 which may be locked thereon between a lock nut 224 and a castellated or cup shaped wing guide member 225 held thereon by a screw 226. A suitable inlet 141 is provided in the side of chamber 140 for the introduction of working fluid under pressure, and a recess or well 227 is provided in the chamber with which the outlet 151 communicates. A valve seat member 228 of suitable material has a valve aperture 142 and a tapered seat 143 surrounding the aperture which is adapted to cooperate with the tapered portion 229 of the valve member, the guide 225 being of such dimension as to move freely through the bore 142 and at the same time prevent excessive lateral movement of the valve, so that the valve properly seats on its downward stroke. A cushion to eliminate water hammer is provided by the hollow tubes or sealed flexible envelopes 231 and 232 enclosing a gas and surrounding the plate 208, the tubes being made of compressible material, such as rubber, so as to cushion the water hammer.

A fluid operated expansible chamber motor having a piston actuated operating valve as disclosed herein produces a very high and sharp peak pressure surge within the motor chamber at the instant the operating valve closes. In motors constructed under the present practice the energy of this peak pressure is lost and it frequently causes the operating valve to flutter and open before the piston stroke is completed. Such operating characteristics are eliminated by the use of the sealed flexible envelopes 231 and 232 which, being subjected to this peak pressure, are compressed by the energy of the peak pressure surge, the energy being absorbed and stored therein and then subsequently released by their expansion to the fluid immediately following the sharp peak pressure surge thus providing a sustained and greater working pressure within the motor chamber. This transfer of energy from the fluid to the envelopes and return to the fluid increases the stroke and power of the motor and prevents fluttering or misoperation of the actuating valve.

The bar 172 is secured at its lower end to the strap 175. Angle bracket 204 has a post 235 threaded therein and held in place by lock nut 236 and which extends through a suitable hole 237 in bar 172. A spring 238 surrounds post 235 between washers 239 and 241 and a nut 242 on the end of the post may be employed to adjust the compression of spring 238.

The base 177 has bosses 245 and 246 having inclined forward faces to which are secured the cantilever leaf springs 247 and 248 by clamping plates 251 and bolts 252. A plate or carrier 253 has similarly inclined extensions 254 and 255 welded thereto and to which the opposite ends of springs 247 and 248 are secured by clamping plates 256 and bolts 257. Plate 253 carries a conveyor trough 182 of any suitable construction secured thereto by bolts 258. The flexible spring strap 181 is suitably secured at one end to plate 253 by nuts 183 and at its opposite end is secured to an adjustable coupling member 259. A threaded stud 261 passing through a suitable hole in bar 172 is held in place by lock nuts 262, and is threaded into coupling member 259 and held in adjusted position by lock nut 263.

The operation of this modification is similar to that described in Figure 1. Ordinarily the springs 247 and 248 together with the trough have a fixed or predetermined period of vibration and the frequency or periodicity of vibration of the motor may be adjusted into synchronism therewith by adjusting nut 242. Moving nut 242 down (Fig. 3) along the post compresses spring 238 and thus increases the frequency of vibration of the motor, while adjusting nut 242 upward releases the compression of spring 238 and reduces the frequency of vibration of the motor. The amplitude of vibration of the system is correspondingly varied. The coupling member 259 allows the motor to be coupled to the conveyor trough without changing the natural frequency of either the trough or conveyor. Thus, when this coupling is effected, the frequency of the entire system and the amplitude of vibration may be varied merely by adjusting spring 238.

By employing the rubber or synthetic rubber resilient members between the valve and diaphragm I am able to obtain a high degree of resiliency or stiffness in a compact structure so that the apparatus may vibrate at a high frequency. As examples of suitable materials for this purpose I may mention natural rubber, and various synthetic rubber materials known under the trade names "Ameripol" and "Cogene," which I believe to be copolymers of butadiene and acrylonitrile or styrene or other unsaturated compounds, "Neoprene," which I believe to be polymerized chlorinated butadiene, and "Koroseal," which I believe to be a plasticized polyvinyl chloride.

The invention may be embodied in other specific forms without departure from the spirit or essential characteristics of the disclosure herein. The specific form described herein therefore is to be considered in all respects as illustrative and not restrictive of the invention.

What I claim as my invention and desire to secure by Letters Patent is:

1. In a hydraulic motor of a single acting expansible chamber type, the combination of a pressure chamber closed by a movable member and having an inlet arranged to be connected to a liquid under pressure and an outlet for discharging liquid from the chamber, said chamber capable of expanding and contracting by the relative movement of the movable member, an operating valve arranged to control the flow of liquid through the outlet connection, a double acting cushion means connecting the movable member with the operating valve to actuate the latter, a sealed flexible envelope enclosing a gas and subjected to the pressure of the liquid in the chamber, said envelope being compressed to absorb the energy of the peak pressure developed upon the closing of the operating valve which energy is subsequently released to the liquid in the chamber to increase the stroke of the movable member and to prevent a rapid drop in pressure in the chamber immediately following the period of peak pressure.

2. In a hydraulic motor of a single acting expansible chamber type, the combination of a pressure chamber closed by a movable member and having an inlet arranged to be connected to a liquid under pressure and an outlet for discharging liquid from the chamber, said chamber capable of expanding and contracting by the relative movement of the movable member, an operating valve arranged to control the flow of liquid through the outlet connection, a double acting cushion means connecting the movable member with the operating valve to actuate the latter, a plurality of flexible envelopes each enclosing a gas and subjected to the pressure of the liquid in the chamber, said envelopes being compressed to absorb the energy of the peak pressure developed upon the closing of the operating valve which energy is subsequently released to the liquid in the chamber to increase the stroke of the movable member and to prevent a rapid drop in pressure in the chamber immediately following the period of peak pressure.

3. In a hydraulic motor of a single acting expansible chamber type, the combination of a pressure chamber closed by a movable member and having an inlet arranged to be connected to a liquid under pressure and an outlet for discharging liquid from the chamber, said chamber capable of expanding and contracting by the relative movement of the movable member, an operating valve arranged to control the flow of liquid through the outlet connection, a double acting cushion means connecting the movable member with the operating valve to actuate the latter, a sealed flexible envelope mounted on the movable member and enclosing a gas, said envelope being subjected to the pressure of the liquid chamber, said envelope being compressed to absorb the energy of the peak pressure developed upon the closing of the operating valve which energy is subsequently released to the liquid in the chamber to increase the stroke of the movable member and to prevent a rapid drop in pressure in the chamber immediately following the period of peak pressure.

RALPH BURT.

REFERENCES CITED

The following references are of record in the file of this patent:

UNITED STATES PATENTS

| Number | Name | Date |
| --- | --- | --- |
| 52,957 | Bridge | Mar. 6, 1866 |
| 134,117 | Wheeler | Dec. 17, 1872 |
| 172,903 | Adams | Feb. 1, 1876 |
| 1,204,522 | Wall | Nov. 14, 1916 |
| 1,305,868 | Baun | June 3, 1919 |
| 1,456,389 | Linkowski | May 22, 1923 |
| 1,865,745 | Crangle | July 5, 1932 |
| 1,910,644 | Smith | May 23, 1933 |
| 2,094,786 | Flint | Oct. 5, 1937 |
| 2,102,826 | Wurzbach et al. | Dec. 21, 1937 |
| 2,126,296 | Weihe | Aug. 9, 1938 |
| 2,187,717 | Weyandt | Jan. 23, 1940 |
| 2,196,930 | Loweke | Apr. 9, 1940 |
| 2,214,755 | Tafel | Sept. 17, 1940 |
| 2,215,895 | Wippel | Sept. 24, 1940 |
| 2,239,298 | Kraut | Apr. 22, 1941 |
| 2,319,608 | Kraut | May 18, 1943 |
| 2,357,386 | Dick | Sept. 5, 1944 |
| 2,364,306 | Miller | Dec. 5, 1944 |